United States Patent [19]

Alfriend, Jr. et al.

[11] 3,843,156
[45] Oct. 22, 1974

[54] CARGO HANDLING TRAILER
[75] Inventors: Theodoric B. Alfriend, Jr.; John H. Klopp, both of Baltimore, Md.
[73] Assignee: The United States of America as represented by the United States Air Force, Washington, D.C.
[22] Filed: Apr. 9, 1973
[21] Appl. No.: 349,902

[52] U.S. Cl. ...... 280/179 R, 105/366 R, 248/119 R, 248/224
[51] Int. Cl. ............................................. B60p 7/12
[58] Field of Search ...................... 280/179 R, 34 R; 105/366 R, 368 R, 369 C, 380, 382; 403/300, 301, 309; 248/119 R, 224

[56] References Cited
UNITED STATES PATENTS

| | | | |
|---|---|---|---|
| 1,735,800 | 11/1929 | Snyder | 105/368 R |
| 1,780,277 | 11/1930 | Seeley | 280/179 R |
| 2,461,927 | 2/1949 | Schaldach et al. | 105/368 R |
| 3,580,627 | 5/1971 | Underwood | 105/368 R |

Primary Examiner—David Schonberg
Assistant Examiner—Michael J. Forman
Attorney, Agent, or Firm—Harry A. Herbert, Jr.; Jacob N. Erlich

[57] ABSTRACT

A cargo handling trailer having a plurality of rail assemblies thereon containing adjustably mounted chock assemblies slideably mounted therein. Each rail assembly is constructed so as to removeably mount thereon a rail extension. Large amounts of cargo may be transported by the trailer by proper placement of the chock assemblies. The rail extensions are utilized to rapidly and simply unload the transported cargo at the desired destination.

4 Claims, 4 Drawing Figures

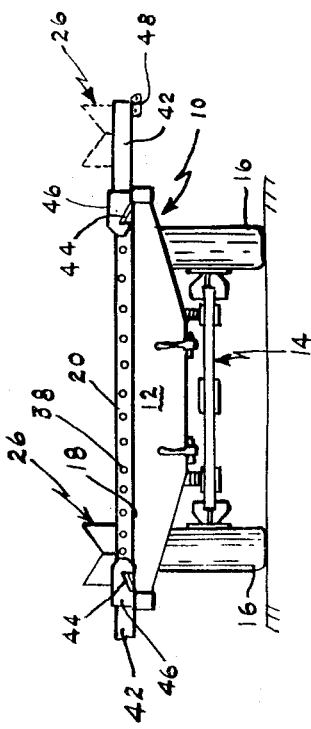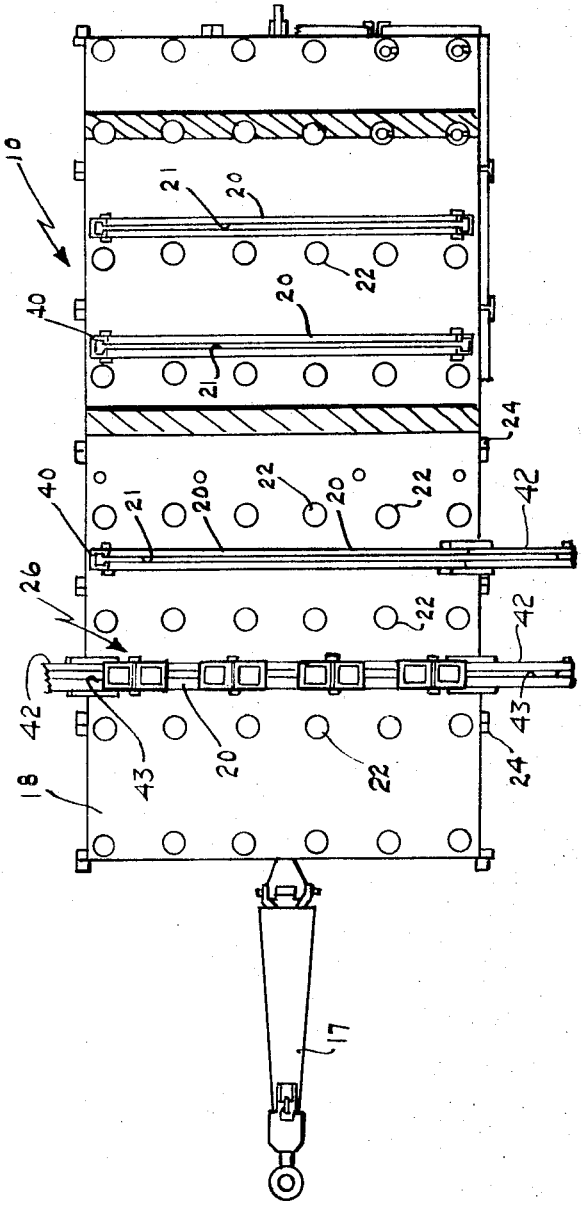

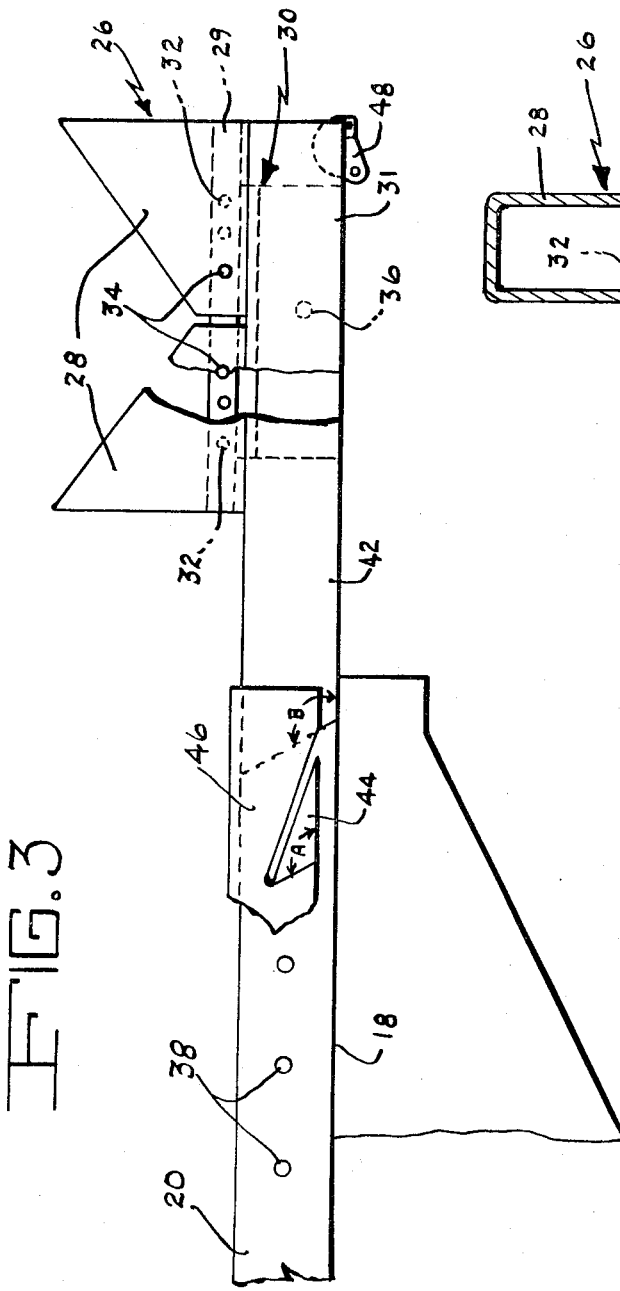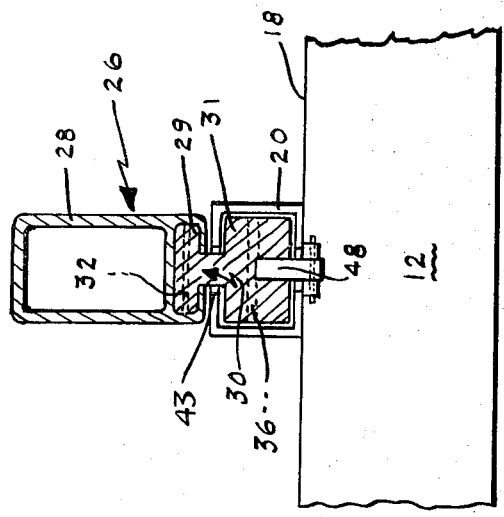

CARGO HANDLING TRAILER

BACKGROUND OF THE INVENTION

This invention relates generally to trailers, and, more particularly, to trailers which are capable of transporting large amounts of cargo and yet are able to easily and quickly unload this cargo at a desired destination.

In many instances it becomes necessary to transport cargo or other such goods over roads by means of trailers. This manner of transportation is extremely conventional and adaptable to various types of power vehicles. Many of the trailers in use today although capable of transporting large quantities of cargo find great difficulty in quickly and efficiently unloading these goods. This difficulty not only arises due to the random nature in which this cargo is placed upon a trailer but also due to the highly complex unloading system utilized. The unloading procedure heretofore in existance is somewhat unreliable because of the complex nature of the equipment used and further because of the substantial training involved. Furthermore, the unloading system utilized with these trailers require a great deal of maintenance for proper operation.

SUMMARY OF THE INVENTION

The instant invention sets forth a trailer which is capable of transporting large amounts of cargo and which further has the capability of easily removing the cargo therefrom. The trailer of this invention is a multi-wheeled trailer of light weight construction and which is capable of being towed behind any conventional towing apparatus. The top deck of the trailer of this invention is a substantially flat surface containing a plurality of cargo tie down rings located flush within the deck surface. Furthermore, tie down fittings are provided at the trailer sides.

A plurality of rail assemblies are mounted on the deck surface of the trailer of this invention. These rail assemblies are capable of holding therein a plurality of chock assemblies which provide a means for fixedly securing thereto the cargo or goods to be transported. The chock assemblies are not only slidably mounted within the rail assembly but are also each individually adjustable in nature so that they may accommodate various sized articles as well as being capable of use in conjunction with one another. Each adjustable chock assembly may further be provided with conventional webbing tie downs and ratchet buckles for fixedly securing articles thereto.

Providing fast and efficient off-loading of the trailer of this invention are a plurality of rail extensions. These rail extensions are removeably secured to the rail assemblies which are fixedly secured to the deck surface. The extensions are capable of rapid installation on either end of the already existing rail assemblies. For removal of the cargo transported by the instant invention a chock assembly is slid from the rail assembly onto the rail extension which protrudes beyond the deck surface. Once in position on the exterior portion of the rail extension the cargo may be easily removed either manually or by machine. After removal of the cargo the rail extensions may be released from the rail assemblies and stored within the trailer for future use.

It is therefore an object of this invention to provide a cargo trailer which is capable of economically transporting large amounts of cargo.

It is a further object of this invention to provide a cargo trailer which utilizes adjustable chock assemblies for holding various sized articles.

It is another object of this invention to provide a cargo trailer which utilizes easily removable rail extensions for quick unloading of the cargo.

It is another object of this invention to provide a cargo trailer which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE DRAWING

FIG. 1 is a rear view of the cargo trailer of this invention having a rail extension mounted thereon;

FIG. 2 is a plan view of the cargo trailer of this invention showing a plurality of chock assemblies, rail assemblies and rail extensions mounted thereon;

FIG. 3 is an enlarged rear view of a chock assembly in position on the rail assembly of the cargo trailer of this invention; and FIG. 4 is an enlarged side view of a rail assembly and chock assembly, shown partly in cross section, mounted on the cargo trailer of this invention.

DETAILED DESCRIPTION OF THE PREFERRED EMBODIMENT

Reference is now made to FIGS. 1 and 2 of the drawing which best show the cargo handling trailer 10 of this invention. Trailer 10 is made of a light weight frame 12 preferably of heat treated aluminum construction. Frame 12 is mounted on a conventional suspension system 14 which includes a plurality of wheels 16. Any conventional tow mount 17 is pivotally secured to frame 12 and can be removeably secured to any suitable towing apparatus (not shown). The top deck 18 of frame 12 is in the form of a substantially flat surface which contains thereon a plurality of rail assemblies 20, as well as tie down fittings 22 and stake pockets 24. The rail assemblies 20 (four of which are shown in FIG. 2 of the drawing) are fixedly secured to top surface or deck 18 of trailer 10. These rail assemblies 20 are located perpendicular with respect to the longitudinal axis of trailer 10 and are in parallel spaced relationship with one another. Any number of rail assemblies 20 may be utilized with the instant invention. Each rail assembly 20 contains an interior slot 21 formed therein. A plurality of chock assemblies 26 (shown on only one rail assembly 20 in FIG. 2 of the drawing) are slidably mounted within slot 21 of rail assemblies 20 and are more clearly shown in FIGS. 3 and 4 of the drawing.

Referring now to FIGS. 3 and 4 of the drawing, each chock assembly 26 is made up of a pair of wedge shaped holding elements 28 so positioned to form a V-shaped cavity therebetween in order to hold any cargo or articles which are to be transported by the trailer 10 of this invention. Wedge shaped holding elements 28 are adjustably mounted on the t-shaped top section 29 of block 30 which in turn is slideably mounted within slot 21 of rail assembly 20. A plurality of apertures 32 are located in section 29 of block 30 and are aligned with a hole 34 within each holding element 28. Any suitable securing means such as a pin is inserted within the aligned holes 32 and 34 in order to fixedly secure holding elements 28 in the desired position upon block 30. In order to fixedly mount chock assembly 26 on rail assembly 20 an aperture 36 is located within the lower rectangular-shaped portion 31 of block 30. Aperture 36 is utilized in conjunction with a plurality of apertures 38 in rail assembly 20 in order to fixedly secure chock assembly 26 thereto. When the desired location of chock assembly 26 is found a pin or any other suitable locking means may be inserted within apertures 36 and 38 for the permanent placing of chock assembly 26. Any suitable stop means such as slugs 40 may be secured to the end of rail assemblies 20 in order to prevent the accidental withdrawal of chock assemblies 26 therefrom.

When it becomes desirable to remove the articles (not shown) held on the cargo handling trailer 10 of this invention, slugs 40 are removed from rail assemblies 20 and a plurality of rail extensions 42 are secured to rail assembly 20 in a manner to be described hereinbelow.

Each rail assembly 20 has a triangular shaped outstanding element 44 fixedly secured thereto at each end thereof. Element 44 has an obtuse angle A equal to angle B forming the end of each rail assembly 20. Each rail extension 42 is made of any desirable length so as to extend beyond deck 18 of trailer 10 when in position thereon. A slot 43 is located within rail extension 42 aligned with the slot 21 of rail assembly 20. A hook shaped element 46 is fixedly secured to or integral with the exterior surface of one end of rail extension 42 while any suitable stop means such as pivotally mounted element 48 is secured to the other end thereof. Adjacent hook 46, rail extension 42 is shaped at an angle B in order to conform to angle at the end of rail assembly 20. Furthermore, the interior configuration of hook 46 is of an angular configuration similar to outstanding element 44 but of a slightly larger size, having the angle A mating with angle A of outstanding element 44. It is therefore a relatively simple operation to insert rail extension 42 in place adjacent rail assembly 20. Chock assemblies 26 can now be easily slid from rail assemblies 20 to rail extensions 42 for removal therefrom. Upon the release of stop means 40, chock assemblies 26 containing the transported articles may be completely removed from rail extensions 42, or if desired, the cargo may be removed directly from chock assemblies 26 when in position on extensions 42.

The cargo mounting and unloading system set forth with the cargo trailer 10 of the instant invention provides for the transportation of large amounts of cargo, and further provides for the quick and easy removal of this cargo upon arriving at its destination. Rail extensions 42 allow for workers or machines to be located proximate trailer 10 and thereby more easily perform the unloading operations. Rail extensions 42 when not in use may be stored within or upon trailer 10 at any suitable location.

Although this invention has been described with reference to a particular embodiment it will be understood to those skilled in the art that this invention is also capable of a variety of alternate embodiments within the spirit and scope of the appended claims.

We claim:

1. A cargo handling trailer comprising a frame, at least one rail assembly fixedly secured to said frame, said rail assembly having an outstanding element, a rail extension removably secured to said rail assembly, means located at one end of said rail extension for removably engaging said outstanding element, a slot formed in said rail assembly and a slot formed in said rail extension, said pair of slots being in alignment with one another when said rail extension is secured to said rail assembly, a chock assembly slideably mounted within said slot in said rail assembly, said chock assembly being made up of a pair of wedge-shaped elements, first means for slideably securing said pair of wedge-shaped elements within said slots in said rail assembly and said rail extensions, second means for slideably securing each of said wedge-shaped elements to said first securing means for adjustable movement of said pair of wedge-shaped elements with respect to one another and means for fixedly securing said chock assembly within said rail assembly whereby upon release of said means for fixedly securing said chock assembly said chock assembly may be easily slid from said rail assembly onto said rail extension to facilitate in the unloading of said trailer.

2. A cargo handling trailer as defined in claim 1 wherein said outstanding element is of a triangular configuration and said engaging means conforms to said triangular configuration.

3. A cargo handling trailer as defined in claim 2 wherein the end of said rail assembly is formed at a predetermined angle, said predetermined angle being substantially equal to one of the angles of said triangular outstanding element on said rail assembly.

4. A cargo handling trailer as defined in claim 3 wherein a stop means is secured at the other end of said rail extension.

* * * * *